(12) United States Patent
Marshall et al.

(10) Patent No.: US 7,111,725 B2
(45) Date of Patent: Sep. 26, 2006

(54) NON-SKID MODULAR PLASTIC CONVEYOR BELT

(75) Inventors: Angela L. Marshall, Harahan, LA (US); David W. Bogle, Destrehan, LA (US)

(73) Assignee: Laitram, L.L.C, Harahan, LA (US)

( * ) Notice: Subject to any disclaimer, the term of this patent is extended or adjusted under 35 U.S.C. 154(b) by 0 days.

(21) Appl. No.: 10/711,922

(22) Filed: Oct. 13, 2004

(65) Prior Publication Data

US 2006/0076218 A1 Apr. 13, 2006

(51) Int. Cl.
*B65G 17/38* (2006.01)
(52) U.S. Cl. .................................. 198/850; 198/853
(58) Field of Classification Search ......... 198/850–853
See application file for complete search history.

(56) References Cited

U.S. PATENT DOCUMENTS

| | | | |
|---|---|---|---|
| 2,033,308 A | 3/1936 | Shonnard | |
| 2,784,835 A * | 3/1957 | Dixon | 198/690.2 |
| 4,051,949 A | 10/1977 | Lapeyre | 198/853 |
| 4,171,045 A | 10/1979 | Lapeyre | 198/853 |
| 4,438,838 A | 3/1984 | Hodlewsky et al. | 198/853 |
| 4,765,454 A | 8/1988 | Hodlewsky et al. | 198/635 |
| 4,832,187 A | 5/1989 | Lapeyre | 198/851 |
| 4,858,751 A | 8/1989 | Hodlewsky | 198/834 |
| 4,858,753 A | 8/1989 | Hodlewsky | |
| 4,984,673 A | 1/1991 | Saito et al. | |
| 5,083,659 A | 1/1992 | Bode et al. | 198/853 |
| 5,215,182 A | 6/1993 | Garbagnati | 198/635 |
| 5,507,383 A * | 4/1996 | Lapyere et al. | 198/853 |
| 5,597,063 A | 1/1997 | Bogle et al. | 198/635 |
| 5,601,180 A | 2/1997 | Steeber et al. | 198/502.1 |
| 5,628,393 A | 5/1997 | Steeber et al. | 198/699.1 |
| 6,068,107 A | 5/2000 | Brun-Jarret | 198/600 |
| 6,068,112 A | 5/2000 | Kasai et al. | 198/853 |
| 6,138,819 A | 10/2000 | Bogle et al. | 198/635 |
| 6,193,056 B1 | 2/2001 | van Zijderveld et al. | 198/853 |
| 6,296,110 B1 | 10/2001 | van Zijderveld et al. | 198/635 |
| 6,382,404 B1 * | 5/2002 | Guldenfels | 198/850 |
| 6,705,460 B1 * | 3/2004 | Weiser et al. | 198/850 |
| 2003/0196876 A1 | 10/2003 | Weiser et al. | 198/850 |

FOREIGN PATENT DOCUMENTS

| | | |
|---|---|---|
| GB | 1276513 | 6/1972 |
| JP | 52009281 | 1/1977 |

OTHER PUBLICATIONS

Intralox, Inc., "Intralox Engineering Manual 2000," copyright 1999; pp. 1-1, 2-41, and 2-42; Intralox, Inc., Harahan, Louisiana, USA.
European Patent Office, European Search Report of European Patent Application No. 05256280.8, Jan. 10, 2006.
Patent Abstracts of Japan vol. 001, No. 060 (M-021), Jun. 10, 1977.

* cited by examiner

*Primary Examiner*—James R. Bidwell
(74) *Attorney, Agent, or Firm*—James T. Cronvich

(57) ABSTRACT

A modular conveyor belt constructed of modules having upstanding ribs, each in the form of textured upper ridge structure atop an elongated rib base. Consecutive ribs are spaced apart laterally on the top surface of the modules. Longitudinal slots between laterally consecutively ribs admit the fingers of transfer plates for smooth transfer of articles on and off the belt. The textured rib structure includes rows of teeth, truncated pyramids or cones, corrugated structure, and sinuous beads atop which articles are supported with little slipping in wet conditions.

33 Claims, 5 Drawing Sheets ately from a first end to a second end, laterally from a first side edge to a second side edge, and in thickness from a top side to a bottom side. A first set of hinge eyes is spaced apart laterally along the first end; a second set, along the second end. The top side has a flat surface. Laterally spaced longitudinal ribs have a solid elongated base that extends outward of the flat surface. Textured upper ridge structure atop the base supports conveyed articles.

NON-SKID MODULAR PLASTIC CONVEYOR BELT

BACKGROUND

The invention relates generally to power-driven conveyors and, more particularly, to modular plastic conveyor belts having a skid-proof top surface.

Modular plastic conveyor belts with raised ribs are used with finger transfer plates or combs to transfer articles smoothly or passengers safely off the end of a conveyor belt. The fingers of the transfer plate extend into slots between raised longitudinal ribs formed on the conveying side of the conveyor belt. The ribs support conveyed articles, which are stripped from the end of the belt carryway by the fingers. The fingers partly occlude the gap that would exist between the end of the belt and a toothless transfer plate to prevent debris from dropping into the drive mechanism of the belt. The flat top surfaces of the ribs, however, do not make for a high-friction surface. For that reason, conventional raised rib belts are not often used in inclines, declines, or wet applications in which a conveyed article is susceptible to slipping along the ribbed conveying surface.

Thus, there is a need for a conveyor belt that provides a non-skid surface on inclines or declines or in a wet environment.

SUMMARY

This need and other needs are satisfied by modular conveyor belts constructed of modules embodying features of the invention. In a first version of the invention, the module comprises a module body that extends longitudinally from a first end to a second end, laterally from a first side edge to a second side edge, and in thickness from a top side to a bottom side. The module body has a first set of hinge eyes spaced apart laterally along the first end and a second set along the second end. Longitudinal rows of truncated rectangular pyramids extend outward of a flat surface on the top side of the module body. Each row of pyramids is spaced laterally from another row to form a longitudinal slot between consecutive rows.

In another version of the invention, a conveyor belt module comprises a module body that extends longitudinally from a first end to a second end, laterally from a first side edge to a second side edge, and in thickness from a top side to a bottom side. A first set of hinge eyes is spaced apart laterally along the first end; a second set, along the second end. The top side has a flat surface. Laterally spaced longitudinal ribs extend outward of the flat surface. The ribs have laterally spaced first and second side walls. Each rib is characterized by longitudinally spaced notches extending through the rib from the first side wall to the second side wall.

In yet another version, a conveyor belt module comprises a module body extending longitudinally from a first end to a second end, laterally from a first side edge to a second side edge, and in thickness from a top side to a bottom side. The module body includes a first set of hinge eyes spaced apart laterally at the first end and a second set of hinge eyes spaced apart laterally at the second end. Teeth are arranged at the top side into a plurality of longitudinal rows. The teeth extend outward at the top side. Each tooth defines with a consecutive tooth on a row a notch that separates the consecutive teeth longitudinally.

In still another version of the invention, a conveyor belt module comprises a module body that extends longitudi- In another aspect of the invention, belt modules of the various versions are connected together edge to edge and end to end into a series of consecutive rows of belt modules interconnected by hinge rods received in lateral passageways formed in the aligned hinge eyes of consecutive rows of belt modules.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
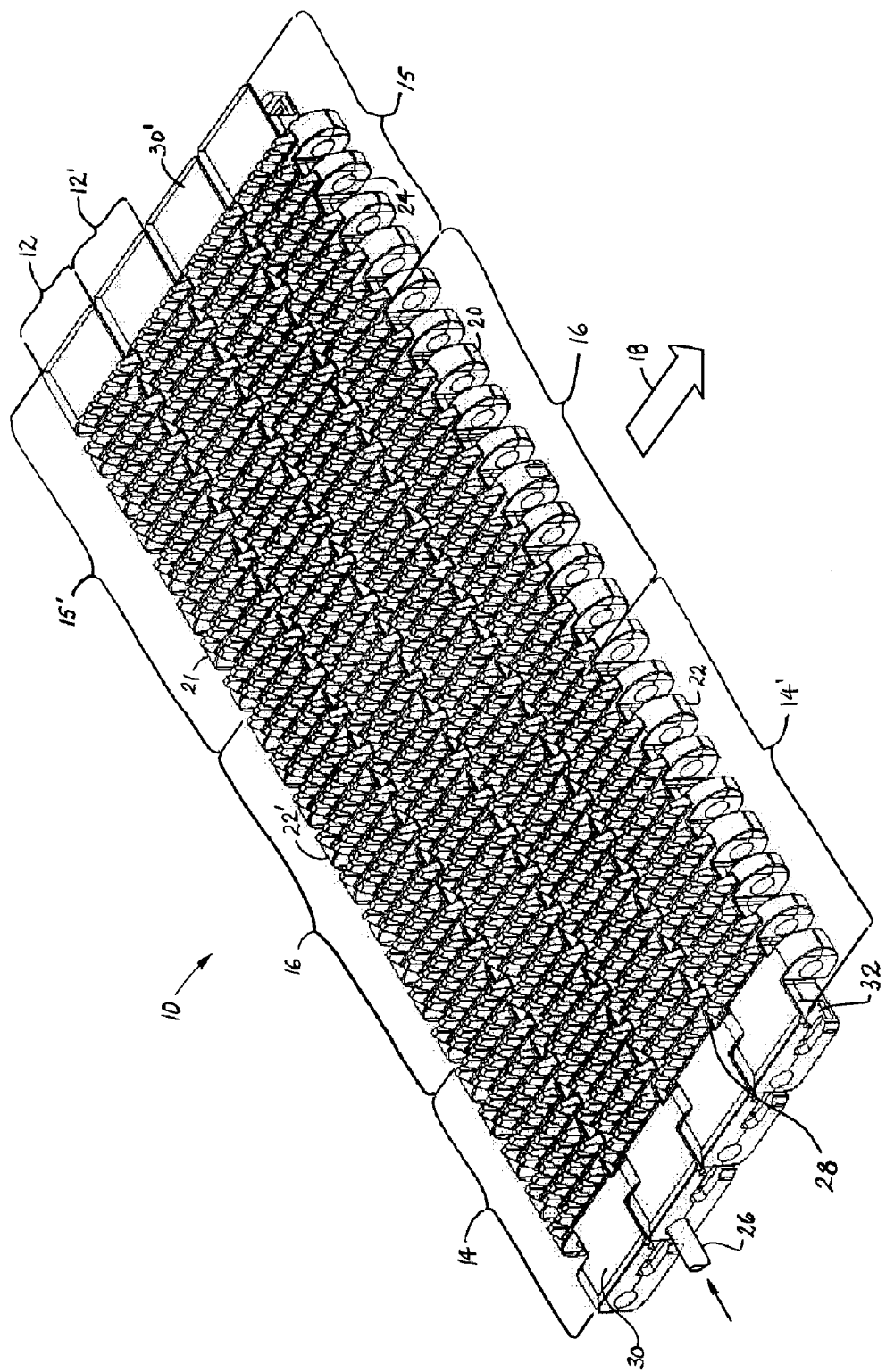
FIG. 1 is an isometric view of a portion of a modular conveyor belt constructed of belt modules embodying features of the invention.

A portion of a conveyor belt embodying features of the invention is shown in FIG. 1. The conveyor belt 10 is constructed of a series of rows 12, 12' of belt modules arranged side by side in the row. The modules include short left-side edge modules 14 and long left-side edge modules 14', short right-side edge modules 15 and long right-side edge modules 15', and interior modules 16. The modules are preferably arranged in a bricklay pattern, in which all the even rows 12 are identical to each other, and all the odd rows 12' are identical to each other. Each module 14, 15, 16 extends in a longitudinal direction, that is, in the direction of belt travel 18, from a first leading end 20 to a second trailing end 21. Sets of hinge eyes 22, 22' are spaced apart laterally along the leading and trailing ends of the modules. The leading hinge eyes of a trailing row of belt modules are interleaved with the trailing hinge eyes of a leading belt row. Apertures 24 in the interleaved hinge eyes between consecutive rows are aligned to form a lateral passageway along the width of the belt. A hinge rod 26, received in the passageway, connects consecutive rows together at a hinge joint 28 at which the belt can articulate as it wraps around a drive or idler sprocket or backbends about shoes or rollers in a return path. The edge modules 14, 14', 15, 15' include an edge portion 30, 30' that may include a cavity 32 for a plug or other rod retention device to confine the hinge rod within the belt. The edge portions 30, 30' in this example have a generally smooth, flat top, unlike the interior portions of the belt, which have a raised structure. The flat top portion is used to smoothly engage shoes or rollers that support the belt and minimize sag in the belt's return path and to admit conveyor structure along the carryway to overlap the side edges of the belt to a height that is level with the raised structure.

The modules are preferably made of thermoplastic materials, such as polypropylene, polyethylene, acetal, or composite materials including fibers for strength in an injection-molding process. The hinge rods may be stainless steel or made of molded or extruded plastic materials. The basic structure of the modules shown is similar to that of the Series 1200 modular plastic belt manufactured and sold by Intralox, L.L.C., of Harahan, La., USA.

Figure 2:
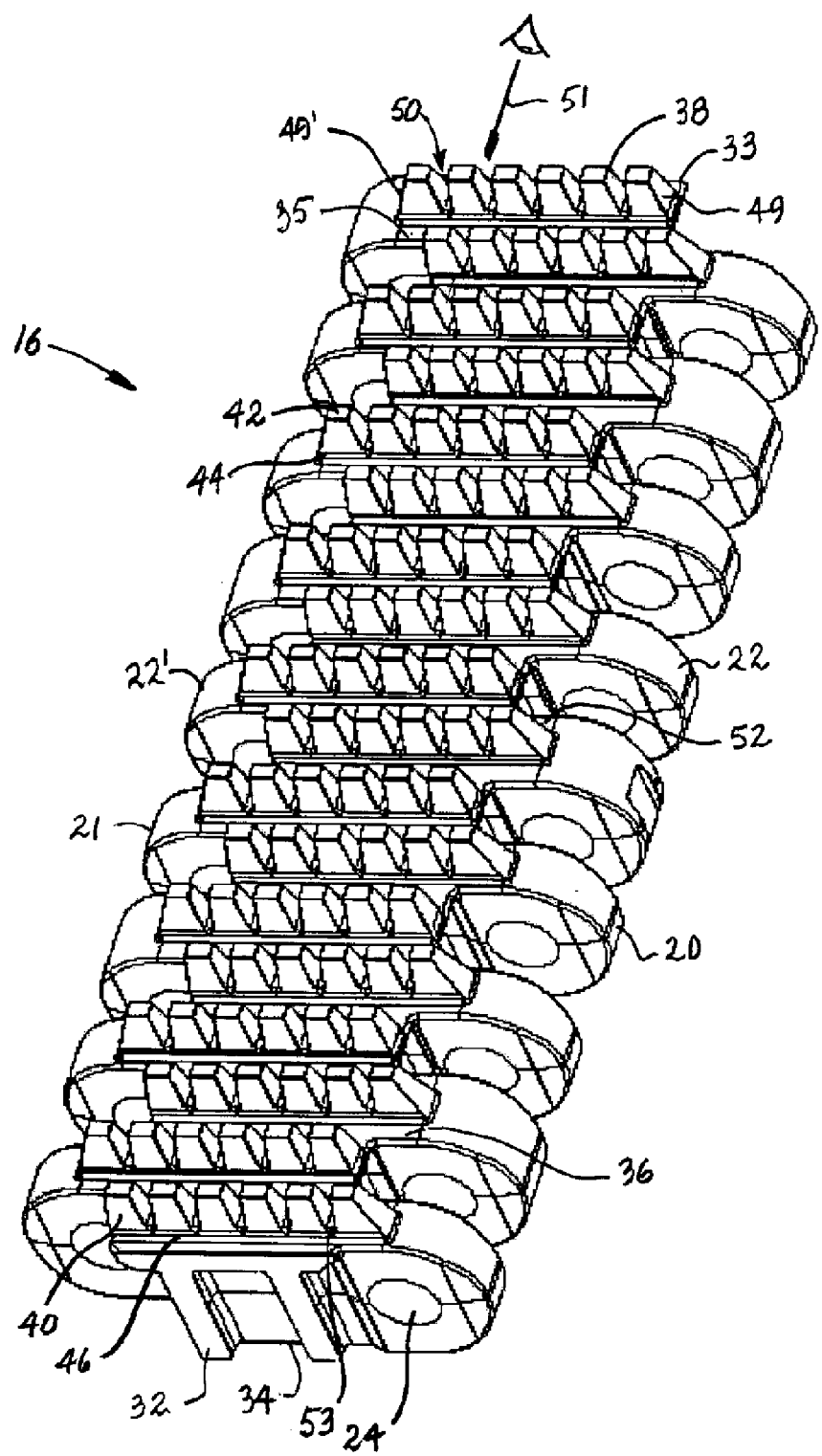
FIG. 2 is a pictorial view of an interior belt module usable in the belt of FIG. 1.
Figure 3:
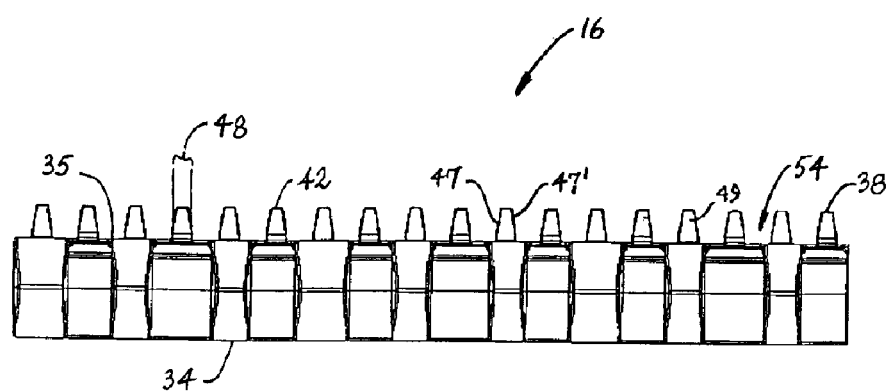
FIG. 3 is a front elevation view of the module of FIG. 2.

The interior module 16 shown in FIGS. 2 and 3 illustrates the non-skid top of the belt in greater detail. The body of the module extends longitudinally from a first end 20 to a second end 21 and laterally from a first side edge 32 to an opposite second side edge 33. The module body extends in thickness from a bottom side 34 to a top side 35. The top side is characterized by a generally flat surface 36 from which ribs 38 in the form of longitudinal rows of teeth 40 extend outward of the flat surface. In this example, each row includes six teeth in the form of truncated rectangular pyramids with rectangular top faces 42 having smaller areas than the bases 44 of the teeth. The teeth form a textured upper rib structure atop the ribs. The bases of the teeth may rest on a long rectangular pedestal, or rib base, 46 or directly on the flat surface of the module. The rib base is solid, without voids. The teeth have opposite side walls 47, 47' separated laterally and defining the thickness 48 of the teeth. Perpendicular to the side walls are a front wall 49 and a rear wall 49'. To simplify molding of the modules, the walls are preferably tapered, making the teeth narrower at the top than at the base. V- or U-shaped notches 50 extend through the ribs from side wall to side wall to form the tooth-like structure. The notches are spaced apart longitudinally on each rib, generally at equal intervals to form the six teeth of more or less equal top area. The vertices 53 of the notches shown in FIG. 2 do not extend to the flat top surfaces of the module, but could extend to the flat surfaces. In this example, notches in laterally consecutive ribs are generally aligned longitudinally to provide a lateral line of sight 51 through aligned notches across the width of the belt. But the notches could be longitudinally staggered and provide no such line of sight.

In the preferred version shown, the leading 22 and trailing 22' hinge eyes are laterally offset from each other. A row of teeth is associated with each hinge eye. In this way, the total number of hinge eyes equals the number of ribs. The inward top portion 52 of each hinge eye is generally coplanar with and merely an extension of the flat top surface of the module body. One of the teeth of each row extends out and onto the top portion of the associated hinge eye. This maintains better uniformity and minimizes gaps in the pattern of teeth at the hinge joints of the belt of FIG. 1. Consecutive ribs are longitudinally offset from each other in accordance with their extension onto their associated hinge eyes.

Figure 4:
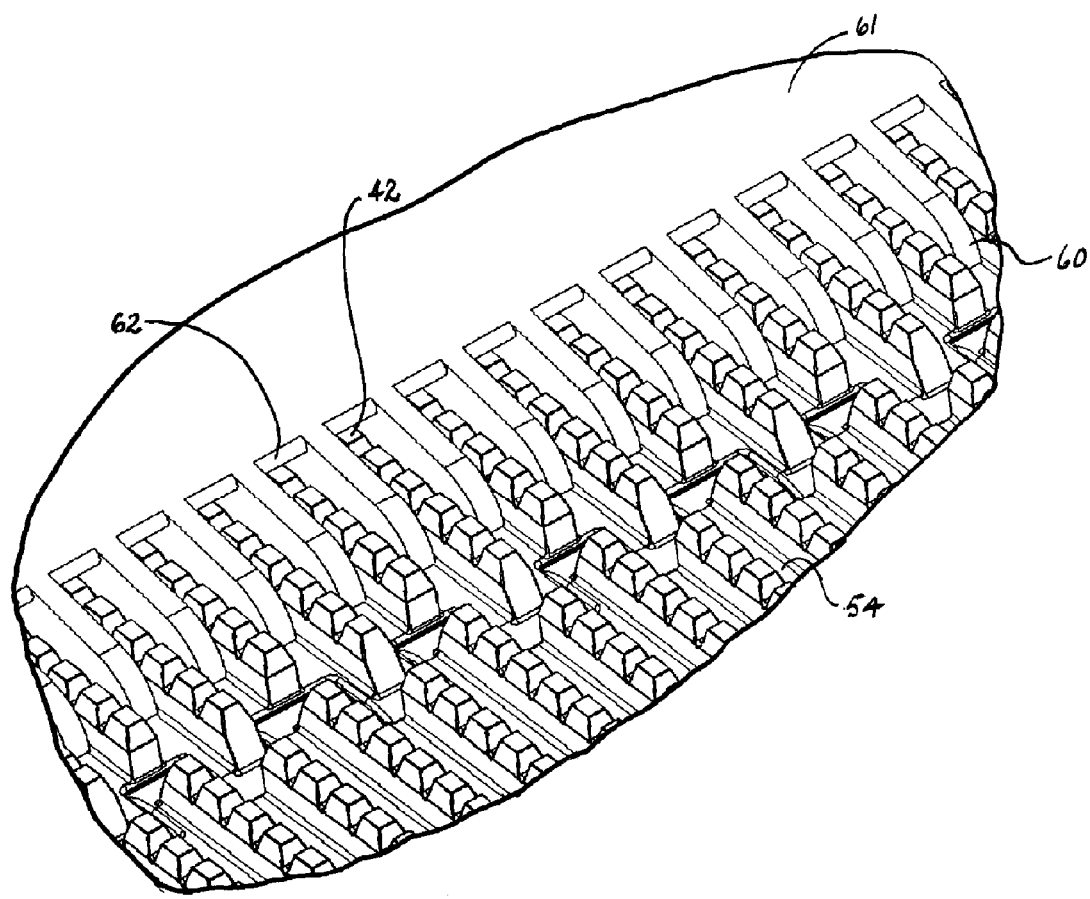
FIG. 4 is an isometric view of a portion of a conveyor belt as in claim 1 engaged by a finger transfer plate.

As shown best in FIGS. 3 and 4, the ribs are spaced apart laterally across longitudinal slots 54. Each slot is wide enough to accommodate a finger 60 of a finger transfer plate 61 at the entrance and exit ends of a conveyor carryway path. A front lip 62 of the transfer plate is generally level with or, more commonly, above the top support faces 42 of the teeth to strip articles or allow trip-free personal egress off the conveyor belt. Preferably, as shown in FIG. 2, the width, or lateral dimension, of the slots is greater than the longitudinal dimension of the notches from tooth to tooth.

Figure 5:
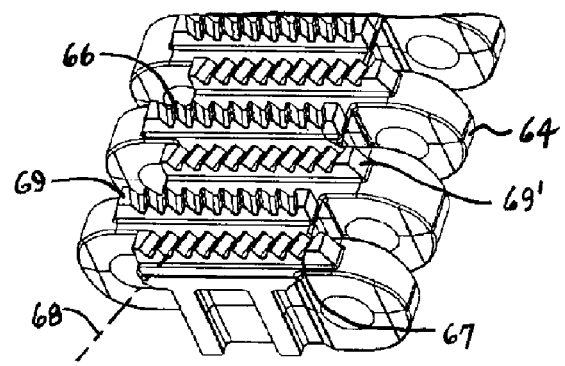
FIG. 5 is a pictorial view of a portion of another version of a ribbed module usable in a belt as in FIG. 1 and embodying features of the invention including an oblique pattern of crests and valleys forming the ridge of the rib.

Another version of belt module is shown in FIG. 5. The module 64 differs from the previous version in that the textured upper ridge structure atop the base of each rib is a series of crests 66 and valleys, or notches, 67 forming corrugations or triangular teeth along the rib. The axes 68 of the crests and valleys are oblique to the longitudinal direction of the module. Laterally alternate ribs 69, 69', in this version, are arranged on axes that are mirror images of each other about the longitudinal direction.

Figure 6:
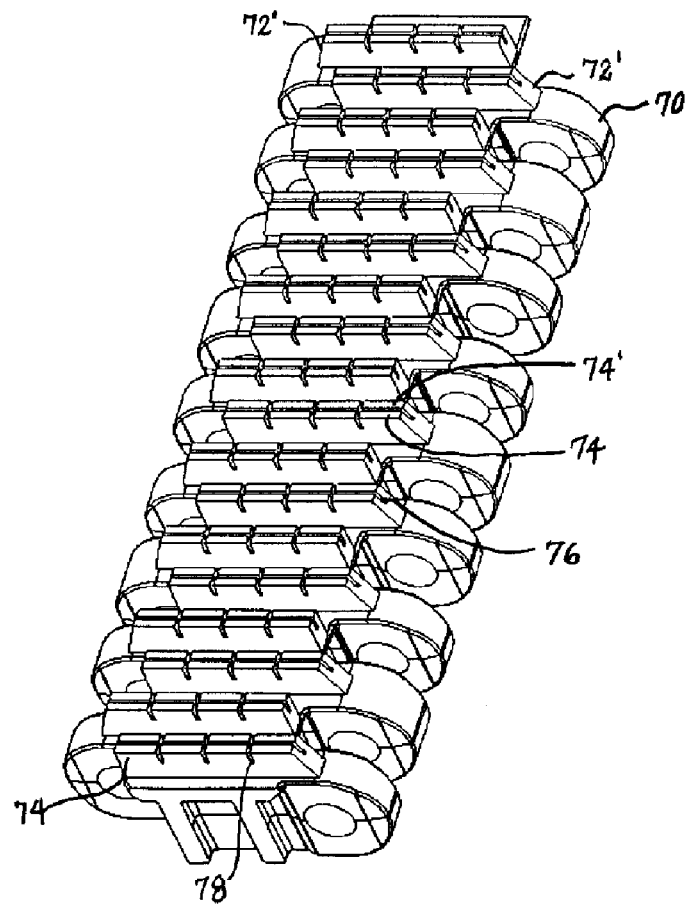
FIG. 6 is a pictorial view of yet another version of a ribbed module usable in a belt as in FIG. 1 and embodying features of the invention including a pair of rows of teeth forming the ridge of each rib.

FIG. 6 shows yet another example of a belt module usable in a conveyor belt as in FIG. 1. In this module 70, each rib 72, 72' has two longitudinal rows of teeth 74, 74' separated laterally by a longitudinal groove 76. Longitudinally spaced notches 78 separate the teeth in each row.

Figure 7:
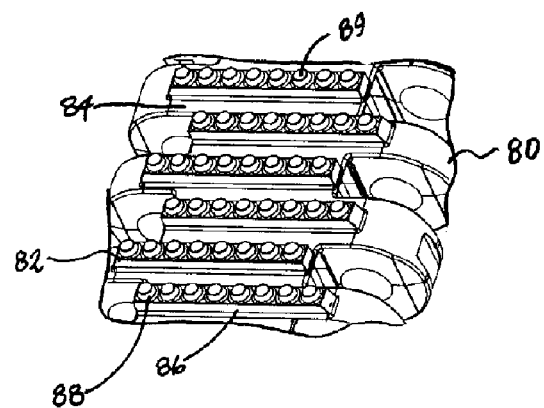
FIG. 7 is a pictorial view of a portion of another version of a ribbed module usable in a belt as in FIG. 1 and embodying features of the invention including a longitudinal row of truncated cones forming the ridge of the rib.

Another example of a non-skid module with textured structure atop ribs is shown in FIG. 7. The module 80 has parallel rows of ribs 82 separated laterally by slots 84. Each rib includes an elongated base 86 topped with a series of projections in the form of truncated cones 88 with flat top faces 89 for supporting articles and presenting a non-skid surface.

Figure 8:
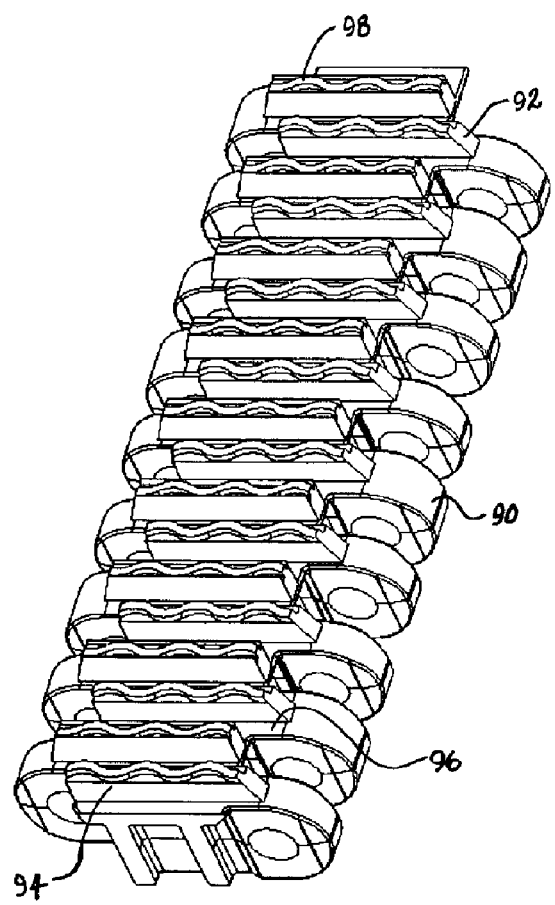
FIG. 8 is a pictorial view of another version of a ribbed module usable in a belt as in FIG. 1 and embodying features of the invention including a sinuous bead forming the ridge of the rib.

Yet another version of module that can be used in a non-skid conveyor belt as in FIG. 1 is shown in FIG. 8. Like other versions, the module 90 has a plurality longitudinal ribs 92 spaced apart laterally by slots that accommodate the fingers of a transfer plate. Each rib has an elongated base portion 94 extending from a flat surface 96 of the module body. Running generally along the length of the rib and forming its upper ridge structure is a sinuous bead 98. The corrugated pattern of the bead provides an effective non-skid pattern.

Unlike continuous, broad, flat-topped ribs that are often used to convey articles, the generally uniform pattern of toothed ribs and other textured upper ridge structures provides a non-skid surface that is especially effective in wet environments and on inclines and declines. The notches between the teeth, the other variations in structure at the ridges of the ribs, and the slots between rows provide gaps that help inhibit articles atop the ribs from sliding freely on the belt. And the raised-rib structure avoids the problems encountered in wet environments by belts that have a generally continuous conveying surface on which water can accumulate and form a slick track for conveyed articles.

Thus, the invention has been shown with respect to a preferred version, but other versions are possible. For example, longer belt modules with more than six teeth per row could be made. As another example, the rib density could be greater or less than one rib per hinge eye on each module. As yet another example, the top flat surface of the belt could be perforated to allow water to drain through it. So, as these few examples suggest, the scope and spirit of the claims is not meant to be limited to the preferred version described in detail.

What is claimed is:

1. A conveyor belt module comprising:
   a module body extending longitudinally from a first end to a second end, laterally from a first side edge to a second side edge, and in thickness from a top side to a bottom side, the module body comprising:
- a first set of hinge eyes spaced apart laterally along the first end;
- a second set of hinge eyes spaced apart laterally along the second end;
- a flat surface on the top side;
- a plurality of laterally spaced longitudinal ribs including a solid elongated base extending outward of the flat surface and textured upper ridge structure atop the base to support conveyed articles;
- wherein the textured upper ridge structure of each rib comprises two longitudinal rows of teeth separated laterally by a longitudinal groove.

2. A modular conveyor belt comprising a plurality of conveyor belt modules as in claim 1 connected together edge to edge and end to end into a series of consecutive rows of belt modules interconnected by hinge rods received in lateral passageways formed in the aligned hinge eyes of consecutive rows of belt modules.

3. A conveyor belt module comprising:
a module body extending longitudinally from a first end to a second end, laterally from a first side edge to a second side edge, and in thickness from a top side to a bottom side, the module body comprising:
- a first set of hinge eyes spaced apart laterally along the first end;
- a second set of hinge eyes spaced apart laterally along the second end;
- a flat surface on the top side;
- a plurality of longitudinal rows of truncated rectangular pyramids extending outwardly of the flat surface and defining notches between consecutive pyramids in each row,
- wherein each row is spaced laterally from another row to form a longitudinal slot between consecutive rows,
- wherein the longitudinal dimension of the notches is less than the lateral dimension of the slots between consecutive rows.

4. A conveyor belt module as in claim 3 wherein the lateral dimension of the slots is at least as great as the lateral dimension of the pyramids.

5. A conveyor belt module as in claim 3 wherein the total number of hinge eyes in the first and second sets equals the number of longitudinal rows.

6. A conveyor belt module as in claim 3 wherein the hinge eyes include a top portion coplanar with the flat surface and wherein one of the pyramids in each row extends from the top portion of a hinge eye.

7. A conveyor belt module as in claim 3 wherein each truncated rectangular pyramid has a rectangular base and a rectangular top face.

8. A conveyor belt module as in claim 7 wherein the area of the rectangular top face of each pyramid is less than the area of the rectangular base.

9. A conveyor belt module as in claim 3 wherein the notches are V-shaped.

10. A conveyor belt module as in claim 3 wherein at least some of the notches of one row are generally aligned laterally with notches of the other rows to form a lateral line of sight through the aligned notches from the first side edge of the module body to the second side edge.

11. A modular conveyor belt comprising a plurality of conveyor belt modules as in claim 3 connected together edge to edge and end to end into a series of consecutive rows of belt modules interconnected by hinge rods received in lateral passageways formed in the aligned hinge eyes of consecutive rows of belt modules.

12. A conveyor belt module comprising:
a module body extending longitudinally from a first end to a second end, laterally from a first side edge to a second side edge, and in thickness from a top side to a bottom side, the module body comprising:
- a first set of hinge eyes spaced apart laterally along the first end;
- a second set of hinge eyes spaced apart laterally along the second end;
- a flat surface on the top side;
- a plurality of laterally spaced longitudinal ribs extending outwardly of the flat surface and having laterally spaced first and second side walls,
- wherein each rib is characterized by longitudinally spaced notches extending through the rib from the first side wall to the second side wall.

13. A conveyor belt module as in claim 12 wherein each rib is further characterized by a longitudinal groove extending the length of the rib between the first side wall and the second side wall.

14. A conveyor belt module as in claim 12 wherein the total number of hinge eyes in the first and second sets equals the number of longitudinal ribs.

15. A conveyor belt module as in claim 12 wherein the hinge eyes include a top portion coplanar with the flat surface and wherein each rib extends onto the top portion of a hinge eye.

16. A conveyor belt module as in claim 12 wherein each rib defines a plurality of teeth separated by the notches.

17. A conveyor belt module as in claim 16 wherein each tooth forms a truncated rectangular pyramid.

18. A conveyor belt module as in claim 12 wherein the notches are V-shaped.

19. A conveyor belt module as in claim 18 wherein the vertices of the V-shaped notches are disposed slightly above the flat surface on the top side of the module body.

20. A conveyor belt module as in claim 12 wherein at least some of the notches of one rib are generally aligned laterally with notches of the other ribs to form a lateral line of sight through the aligned notches from the first side edge of the module body to the second side edge.

21. A modular conveyor belt comprising a plurality of conveyor belt modules as in claim 12 connected together edge to edge and end to end into a series of consecutive rows of belt modules interconnected by hinge rods received in lateral passageways formed in the aligned hinge eyes of consecutive rows of belt modules.

22. A conveyor belt module comprising:
a module body extending longitudinally from a first end to a second end, laterally from a first side edge to a second side edge, and in thickness from a top side to a bottom side, the module body comprising:
- a first set of hinge eyes spaced apart laterally at the first end;
- a second set of hinge eyes spaced apart laterally at the second end;
- a plurality of teeth arranged at the top side into a plurality of longitudinal rows of teeth separated by longitudinal slots extending longitudinally along the top side,
- wherein each tooth defines with a consecutive tooth on a row a notch that separates the consecutive teeth longitudinally, and wherein the longitudinal dimension of the notches is less than the lateral dimension of the slots.

23. A conveyor belt module as in claim 22 wherein each tooth is in the form of a truncated cone.

24. A conveyor belt module as in claim 22 wherein the total number of hinge eyes in the first and second sets equals the number of longitudinal rows of teeth.

25. A conveyor belt module as in claim 22 further comprising a flat surface at the top side of the module and wherein the hinge eyes include a top portion coplanar with the flat surface and wherein one of the teeth in each row extends from the top portion of a hinge eye.

26. A conveyor belt module as in claim 22 wherein each tooth is in the form of a rectangular pyramid.

27. A conveyor belt module as in claim 22 wherein each tooth includes a rectangular base at the bottom and a flat top face.

28. A conveyor belt module as in claim 27 wherein the area of the top face is less than the area of the rectangular base.

29. A conveyor belt module as in claim 22 wherein each tooth has a base at the bottom and an opposite top face and, between the base and the top face, a pair of opposite side walls laterally spaced from each other and a front wall and an opposite rear wall longitudinally spaced from each other.

30. A conveyor belt as in claim 29 wherein each of the side walls, the front wall, and the rear wall tapers toward its opposite wall with distance from the base.

31. A conveyor belt module as in claim 22 wherein the notches are V-shaped.

32. A conveyor belt module as in claim 22 wherein at least some of the notches of one row are generally aligned laterally with notches of the other rows to form a lateral line of sight through the aligned notches from the first side edge of the module body to the second side edge.

33. A modular conveyor belt comprising a plurality of conveyor belt modules as in claim 22 connected together edge to edge and end to end into a series of consecutive rows of belt modules interconnected by hinge rods received in lateral passageways formed in the aligned hinge eyes of consecutive rows of belt modules.

* * * * *